(12) United States Patent
Li et al.

(10) Patent No.: US 11,899,681 B2
(45) Date of Patent: Feb. 13, 2024

(54) KNOWLEDGE GRAPH BUILDING METHOD, ELECTRONIC APPARATUS AND NON-TRANSITORY COMPUTER READABLE STORAGE MEDIUM

(71) Applicant: BOE Technology Group Co., Ltd., Beijing (CN)

(72) Inventors: Hui Li, Beijing (CN); Lei Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/944,521

(22) Filed: Jul. 31, 2020

(65) Prior Publication Data
US 2021/0097089 A1    Apr. 1, 2021

(30) Foreign Application Priority Data

Sep. 27, 2019   (CN) .......................... 201910926347.1

(51) Int. Cl.
*G06F 16/25*      (2019.01)
*G06F 16/951*     (2019.01)
(Continued)

(52) U.S. Cl.
CPC ........ *G06F 16/258* (2019.01); *G06F 16/9024* (2019.01); *G06F 16/951* (2019.01); *G06N 5/02* (2013.01)

(58) Field of Classification Search
None
See application file for complete search history.

(56) References Cited

U.S. PATENT DOCUMENTS

2012/0330954 A1* 12/2012 Sivasubramanian ........................ H04L 67/1097
707/E17.089
2015/0363706 A1* 12/2015 Huber ...................... G06N 5/02
707/603

(Continued)

FOREIGN PATENT DOCUMENTS

CN    106021281 A    10/2016
CN    106815307 A    6/2017
(Continued)

OTHER PUBLICATIONS

Zhou Kang, "Domain knowledge graph construction method and system based on big data driving" (Year: 2018).*
(Continued)

*Primary Examiner* — Kris E Mackes
*Assistant Examiner* — Soheila (Gina) Davanlou
(74) *Attorney, Agent, or Firm* — Nath, Goldberg & Meyer; Joshua B. Goldberg

(57) ABSTRACT

The present disclosure relates to a method for building a knowledge graph, an electronic apparatus and a non-transitory computer-readable storage medium. The method for building a knowledge graph includes following steps: acquiring source data related to preset keywords according to the preset keywords; cleaning the source data according to a preset data dictionary and an error information table; extracting entities, attribute information of the entities and relationship information among the entities from the cleaned source data according to the preset data dictionary and an entity relationship; fusing the entities, the attribute information of the entities and the relationship information among the entities to obtain data triples, and taking the data triples as a built knowledge graph; and storing the knowledge graph into a preset graph database.

8 Claims, 6 Drawing Sheets

(51) Int. Cl.
*G06F 16/901* (2019.01)
*G06N 5/02* (2023.01)

(56) References Cited

U.S. PATENT DOCUMENTS

| | | | | |
|---|---|---|---|---|
| 2016/0019554 A1* | 1/2016 | MacDonald-Korth | ...................... | G06Q 30/0278 705/317 |
| 2018/0349511 A1* | 12/2018 | Kleiman-Weiner | ......................... | G06F 16/9024 |
| 2018/0349817 A1* | 12/2018 | Goel | .................. | G06Q 10/0635 |
| 2020/0265218 A1* | 8/2020 | Dai | ....................... | G06K 9/6267 |
| 2020/0394551 A1* | 12/2020 | Rao | ..................... | G06F 21/6209 |

FOREIGN PATENT DOCUMENTS

| CN | 109597855 A | * | 4/2019 |
|---|---|---|---|
| CN | 109657068 A | | 4/2019 |
| CN | 109710935 A | | 5/2019 |

OTHER PUBLICATIONS

First Office Action dated Nov. 3, 2021 corresponding to Chinese application No. 201910926347.1.
"Construction and Application of Cultural Relics Knowledge Graph"; 2019.

* cited by examiner

KNOWLEDGE GRAPH BUILDING METHOD, ELECTRONIC APPARATUS AND NON-TRANSITORY COMPUTER READABLE STORAGE MEDIUM

CROSS REFERENCE TO RELATED APPLICATIONS

The present application claims the priority of the Chinese Patent Application with the Application No. 201910926347.1 filled Sep. 27, 2019, which is incorporated herein in the entire by reference.

TECHNICAL FIELD

The present disclosure relates to the field of data processing technology, and in particular, to a method for building a knowledge graph, an electronic apparatus, and a non-transitory computer-readable storage medium. Especially, the present disclosure relates to a method for building a knowledge graph suitable for the field of arts, an electronic apparatus, and a non-transitory computer-readable storage medium.

BACKGROUND

At present, with the improvement of living standard of people, more and more users seek to improve the living standard, such as purchasing, learning and appreciating art works. At present, a user may inquire an art work in an online mode and an offline mode. Taking the online mode as an example, the user may search corresponding art works on the Internet, and after inquiring an art work of interest, the user may continuously inquire other data related to the art work.

SUMMARY

The present disclosure provides a method for building a knowledge graph; an electronic apparatus and a non-transitory computer readable storage medium.

According to a first aspect of an embodiment of the present disclosure, there is provided a method for building a knowledge graph, including steps of: acquiring source data related to preset keywords according to the preset keywords; cleaning the source data according to a preset data dictionary and an error information table; extracting entities, attribute information of the entities and relationship information among the entities from the cleaned source data according to the preset data dictionary and an entity relationship; fusing the entities, the attribute information of the entities and the relationship information among the entities to obtain data triples as the knowledge graph; and storing the knowledge graph into a preset graph database.

In one embodiment, the keywords are keywords in a field of arts; the preset data dictionary is a data dictionary of arts; the error information table is an error information table related to the field of arts; and the preset entity relationship is a preset entity relationship among a painter, a painting and a museum.

In one embodiment, the source data includes semi-structured source data and structured source data; the acquiring source data related to preset keywords according to the preset keywords in the field of arts includes steps of: crawling the semi-structured source data on a preset target website related to the field of arts by using a scram; application framework according to the keywords; and/or, retrieving the structured source data in a preset database related to the field of arts according to the keywords.

In one embodiment, in response to the source data including the semi-structured source data, before cleaning the source data according to a preset data dictionary of arts and an error information table related to the field of arts, the method further includes preprocessing the semi-structured source data to obtain the structured source data, including steps of: dividing the semi-structured source data into a plurality of groups according to preset attribute information; obtaining, based on a Word2vec algorithm, similarity vectors corresponding to data in the semi-structured source data in the plurality of groups; obtaining a similarity between any two data in a same group based on the similarity vectors; comparing the similarity with a preset similarity threshold; in response to the similarity exceeding the preset similarity threshold, fusing the two data into a piece of semi-structured source data; and for the fused semi-structured source data, extracting corresponding data from the source data to form the structured source data.

In one embodiment, the step of cleaning the source data according to a preset data dictionary of arts and an error information table related to the field of arts includes steps of: processing a single-valued attribute in the source data by using the error information table to replace an error value in the single-valued attribute with a correct value; inquiring entity attribute information and relationship information corresponding to the source data from the preset data dictionary of arts and a relationship table according to the single-valued attribute; looking through the source data in the error information table; and in response to the error information table not containing the source data, of which the single-valued attribute is required to be replaced, outputting the entity attribute information and the relationship information corresponding to the source data.

In one embodiment, the method for building a knowledge graph further includes: applying the knowledge graph to a preset scene.

In one embodiment, the preset scene includes at least one of scenes of: encyclopedia cards, searching, recommending, asking and answering, explaining, assisting in decision making.

According to a second aspect of an embodiment of the present disclosure, there is provided an electronic apparatus including a processor and a memory for storing executable instructions; the processor is connected with the memory through a communication bus and is configured to read the executable instructions from the memory to perform the method according to the first aspect of an embodiment of the present disclosure.

According to a third aspect of an embodiment of the present disclosure, there is provided a non-transitory computer-readable storage medium having computer-executable instructions stored thereon, wherein the instructions, when executed by a processor, cause the processor to perform the method according to the first aspect of an embodiment of the present disclosure.

BRIEF DESCRIPTION OF DRAWINGS

Accompanying drawings, which are incorporated in and constitute a part of this description, illustrate embodiments consistent with the present disclosure and serve to explain the principles of the present disclosure together with the embodiments.

DETAIL DESCRIPTION OF EMBODIMENTS

Figure 1:
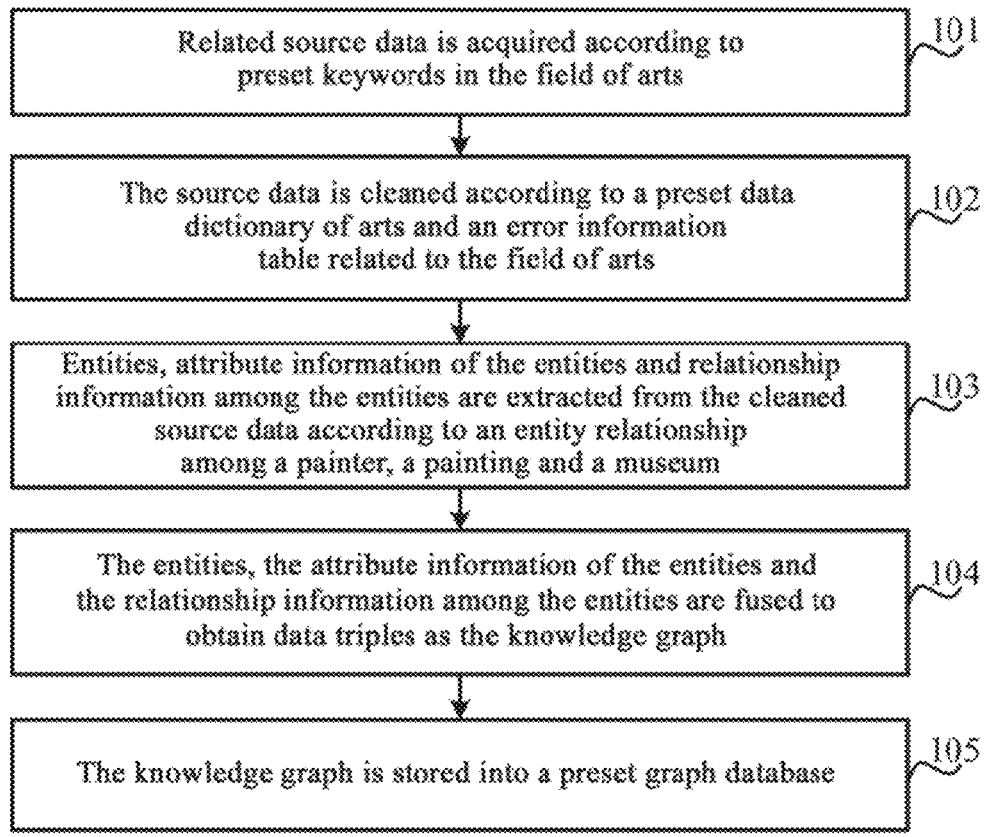
FIG. 1 is a flowchart of a method for building a knowledge graph suitable for the field of arts according to an embodiment of the present disclosure.

Exemplary embodiments will now be described herein in detail, and examples of the exemplary embodiments are illustrated in the accompanying drawings. The following description refers to the accompanying drawings in which like or similar reference numerals refer to like or similar elements in different drawings, unless otherwise indicated. An implementation described in the exemplary embodiments below does not represent all implementations consistent with the present disclosure. Rather, they are merely examples of devices and methods consistent with certain aspects of the present disclosure, as detailed in the appended claims.

Knowledge graph (KG) describes concepts, entities and relationships therebetween in the objective world in a structured form, expresses information of the Internet into a form closer to the cognitive world for human, and provides a capability of better organizing, managing and understanding mass information of the Internet. The knowledge graph brings vitality to a semantic search, and shows powerful power in an intelligent question answering, and becomes an infrastructure of an intelligent application driven by Internet knowledge. The knowledge graph, together with big data and deep learning, becomes one of core driving forces for promoting the development of Internet and artificial intelligence.

The knowledge graph is divided into two types, that is, a general type and a domain type. The two types of graphs are the same in nature, and the difference between them is mainly reflected in a coverage range and a use mode. The general type of knowledge graph may be vividly seen as a structured encyclopedia knowledge base facing to a general field, which contains a large amount of common knowledge in the real world and has a wide coverage. The domain knowledge graph is also called an industry knowledge graph or a vertical knowledge graph, which generally faces a specific field and may be regarded as an industry knowledge base based on a semantic technology. Because the domain knowledge graph has strict and rich data modes due to being built based on industry data, the domain knowledge graph has higher requirements on the depth and accuracy of knowledge in the field.

At present, with the improvement of living standard of people, more and more users seek to improve the living standard, such as purchasing, learning and appreciating art works. At present, a user may inquire an art work in an online mode and an offline mode. Taking the online mode as an example, the user may search corresponding art works on the Internet, and after inquiring an art work of interest, the user may continuously inquire other data related to the art work, so that the data inquired by the user are dispersed, even relative important information is omitted, and thereby searching experience of the user is influenced.

In order to solve problems in the related art in which due to the fact that knowledge distribution of art works is dispersed, retrieval by a user is difficult and important information is easily omitted, and searching experience of the user is influenced, a method and a device for building the knowledge graph are provided in embodiments of the present disclosure. The method and the device are suitable for various electronic apparatus, such as a server, a smart phone and a tablet computer and the like, and support corresponding applications such as a question answering system, a recommendation system and encyclopedia in the future.

The knowledge graph represents entities, events, and relationships between them in the form of graphs. The knowledge graph stores and inquires a research of how to design an effective storage mode to support an effective management for large scale graph data, which realizes an efficient query of knowledge in the knowledge graph. To address challenges in graph database management and processing, in recent years, many graph systems have been proposed for different aspects, including data modeling, offline graph analysis, and online graph data query.

Applications of knowledge graphs are currently focused on searching, recommending, asking and answering, explaining, assisting in decision making and the like.

According to a first aspect of an embodiment of the present disclosure, there is provided a method for building a knowledge graph, including following steps:

acquiring related source data according to preset keywords;

cleaning the source data according to a preset data dictionary and an error information table;

extracting entities, attribute information of the entities and relationship information among the entities from the cleaned source data according to the preset data dictionary and an entity relationship;

fusing the entities, the attribute information of the entities and the relationship information among the entities to obtain data triples, and taking the data triples as a built knowledge graph by the keywords; and storing the knowledge graph into a preset graph database.

FIG. 1 is a flowchart of a method for building a knowledge graph suitable for the field of arts according to an embodiment of the present disclosure. Referring to FIG. 1, a method for building a knowledge graph suitable for the field of arts includes following steps 101 to 105.

In step 101, related source data is acquired according to preset keywords in the field of arts.

In this embodiment, keywords may be preset in an electronic apparatus, and the keywords may include keywords in the field of arts, such as painters, calligraphers, paintings, collectors, museums, and the like, and the number of the keywords may be adjusted according to a specific scene. In one example, the key words may be preset within a keyword table or within a keyword database.

The electronic apparatus may acquire sentences input by a user, segment the sentences into words, match the segmented words with the preset keywords, and determine that the key words are acquired if the segmented words are matched with the preset keywords.

After acquiring the keywords, the electronic apparatus may acquire the source data related to the keywords according to the keywords.

Specifically, in one example, the electronic apparatus may crawl semi-structured source data on a preset target website (e.g., the artchina) related to the art field by using a scrapy application framework according to the keywords. The semi-structured data belong to entities of a same type and may have different attributes. That is, the semi-structured data does not conform to a relational database or other data model structures in which data tables are associated in modes, but contains related marks for separating semantic elements and layering records and fields. Thus, "semi-structured" is also referred to as self-described-structured.

The scrapy is a program framework for implementing a web scrapy, which is developed based on python and includes a scrapy engine, a scheduler, a downloader, spiders, a downloader middleware, a spider middleware, an item pipeline, and the like.

The scrapy engine is configured to control a flow of data streams among all components in a system and trigger events when corresponding action occurs.

The scheduler is configured to receive requests from the scrapy engine and enqueue the requests, for presentation to the scrapy engine as the scrapy engine makes requests, i.e., dequeue the requests.

The downloader is configured to acquire page data and provide the page data to the engine and, in turn, to the spider.

Spiders are classes that users write to parse responses and extract items (i.e., entity object data that is acquired) or additionally follow-up URL addresses from the parsed responses. Each spider is configured to process a particular website (or web sites). The items are structures of data objects defined in the item pipeline, the responses are processed in the spiders to obtain data that conforms to the defined item structures, and the items are then passed from the spiders back to the item pipeline, where a storage method is defined to store the items persistently.

The downloader middleware is a special hook between the engine and the downloader, which is configured to process the responses passed by the downloader to the engine. Thus, a simple mechanism is provided, in which a scrapy function is expanded by inserting custom codes.

The spider middleware is a special hook between the engine and spiders, which is configured to process an output of the spiders (requests and items) and an input transmitted to the spiders (responses). Thus, a simple mechanism is provided, in which a scrapy function is expanded by inserting custom codes.

The item pipeline is configured to process items extracted by the spiders. Typical processing may include cleaning, validation, and persistence (e.g., storage into a database).

Figure 2:
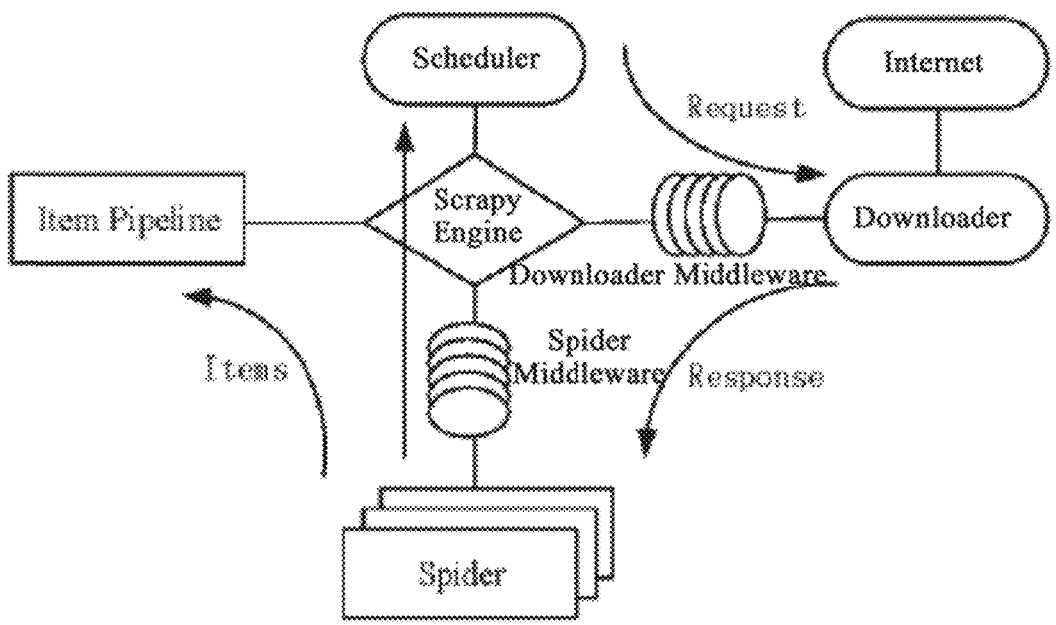
FIG. 2 is a flow diagram illustrating obtaining semi-structured source data according to an embodiment of the present disclosure.

For example, the electronic apparatus may launch the scrapy engine in the scrapy application framework, and data streams are controlled by the scrapy engine in the scrapy application framework. FIG. 2 is a flow chart illustrating obtaining semi-structured source data according to an embodiment of the present disclosure. Referring to FIG. 2, a process during which data streams are controlled by the scrapy engine in the scrapy application framework may include:

(1) The spider calls a first target URL to be crawled, generates a request for the URL, transmits the request to the scheduler through the scrapy engine; the scheduler transmits the request to the downloader through the scrapy engine and the downloader middleware to download a webpage of the URL, and the downloader acquires the response to the URL. A spider is an overall scrapy that includes a logic to request web content from a web page URL and to process the web content to extract items. A spider may process an initial one website URL or process a plurality of website URLs that are initially set.

(2) The spider transmits a request to the scheduler through the scrapy engine for a next URL to be crawled.

(3) The scheduler forwards the request to the downloader via the downloader middleware (in a direction of the request). Because the spider calls the downloader and the item pipeline through an underlying logic, developers using the scrapy framework do not need to write the underlying logic, which has been packaged in the source codes, and the spider calls the downloader and the item pipeline directly. The spider interacts with the downloader and the item pipeline through the scrapy engine.

(4) Once the page is downloaded, the downloader generates a response (web content) for the page and transmits it to the spider for processing via the downloader middleware, the scrapy engine and the spider middleware (in a direction of the response), and in particular, the spider extracts the items from the response.

(5) The spider passes the items extracted in the response to the item pipeline for processing by the item pipeline; the typical processes may include cleaning, validation, and persistence (e.g., storage into a database).

(6) Repeating steps (from the step (2)) until there is no generated request for URL in the spiders, the spider ends the scrapy, and further, the spider's whole scrapy ends.

Figure 3:
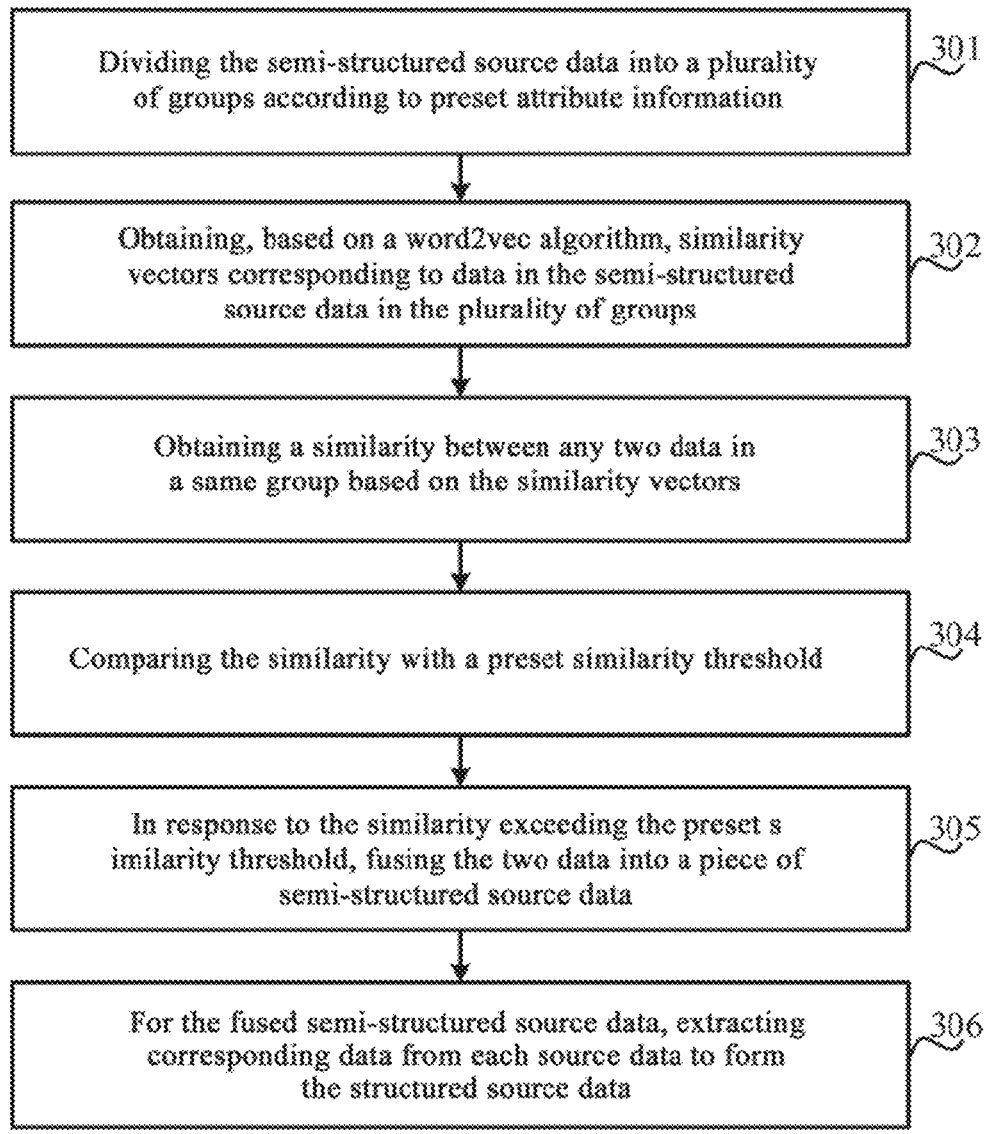
FIG. 3 is a flow diagram illustrating converting semi-structured source data into structured source data according to an embodiment of the present disclosure.

The semi-structured source data is also preprocessed in this example, taking into account characteristics of the semi-structured source data. FIG. 3 is a flow diagram illustrating converting semi-structured source data into structured source data according to an embodiment of the present disclosure. Referring to FIG. 3, the electronic apparatus may divide the semi-structured source data into a plurality of groups according to preset attribute information (in step 301 in FIG. 3). Then, the electronic apparatus may obtain, based on a Word2vec algorithm, similarity vectors corresponding to data in the semi-structured source data in the plurality of groups (in step 302 in FIG. 3). Thereafter, the electronic apparatus may obtain a similarity between any two data in a same group based on the similarity vectors (in step 303 in FIG. 3). Furthermore, the electronic apparatus may compare the similarity with a preset similarity threshold (in step 304 in FIG. 3). If the similarity exceeds the preset similarity threshold, the two data are fused into a piece of source data as a fused semi-structured source data (in step 305 in FIG. 3). Finally, for the fused semi-structured source data, corresponding data is extracted from the source data to form the structured source data (in step 306 in FIG. 3).

In this example, preprocessing the semi-structured source data may remove redundancy and enrich the source data. In addition, the semi-structured source data is converted into the structured source data, to facilitate subsequent processing.

In another example, the electronic apparatus may retrieve the structured source data in a preset database related to the field of arts according to the keywords. The structured data may be represented by data or a unified structure, is represented in a two-dimensional form, and has the following characteristics: data has a row as a unit, one row of data represents information of one entity, and each row of data has a same attribute.

It should be noted that in this embodiment, by classifying the source data (the semi-structured data and the structured data) and acquiring the source data by using different acquisition manners for each classification, an acquisition efficiency may be improved.

As shown in FIG. 1, in step 102, the source data is cleaned according to a preset data dictionary of arts and an error information table related to the field of arts.

In this embodiment, a data dictionary of arts may be preset in the electronic apparatus, and the data dictionary of arts may include a single-valued attribute, entity attribute information, and relationship information of the source data. In some examples, other information may be included in the data dictionary of arts, and the other information may be adjusted according to a specific scene, and is not limited herein. It is understood that the data dictionary of arts in this embodiment may be updated in real time or periodically. In this embodiment, an error information table related to the field of arts may be preset in the electronic apparatus, and the error information table may include a combination of several sets of error information and correct information, such as van Gogh (correct), fango (error).

Figure 4A:
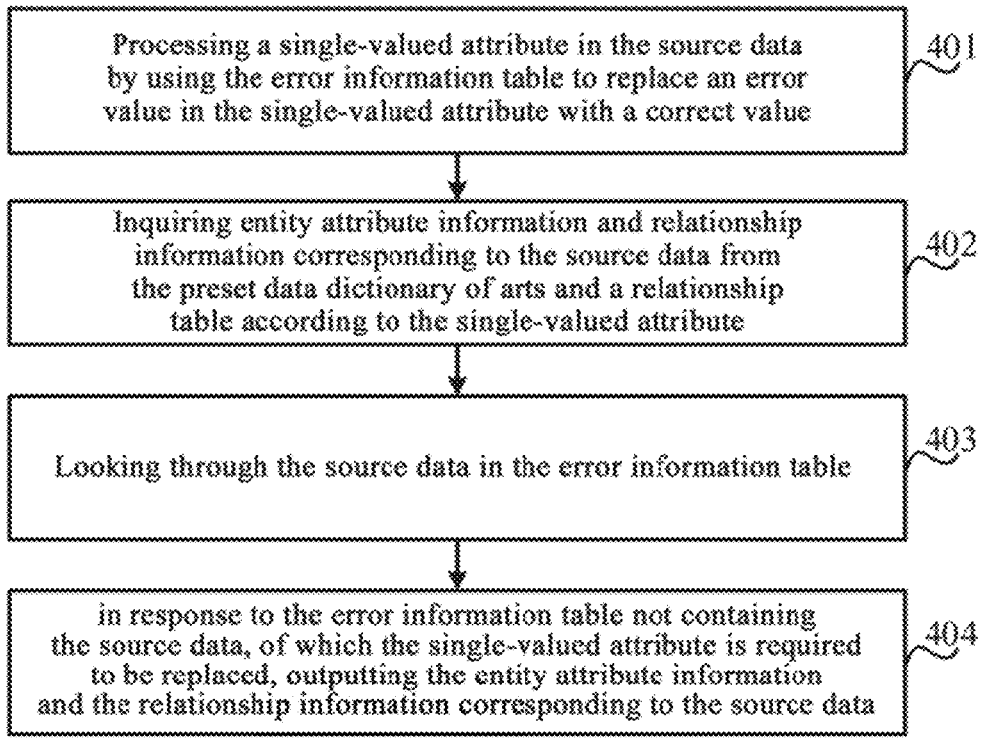
FIGS. 4a and 4b are flow diagrams illustrating cleaning the source data according to an embodiment of the present disclosure.
Figure 4B:
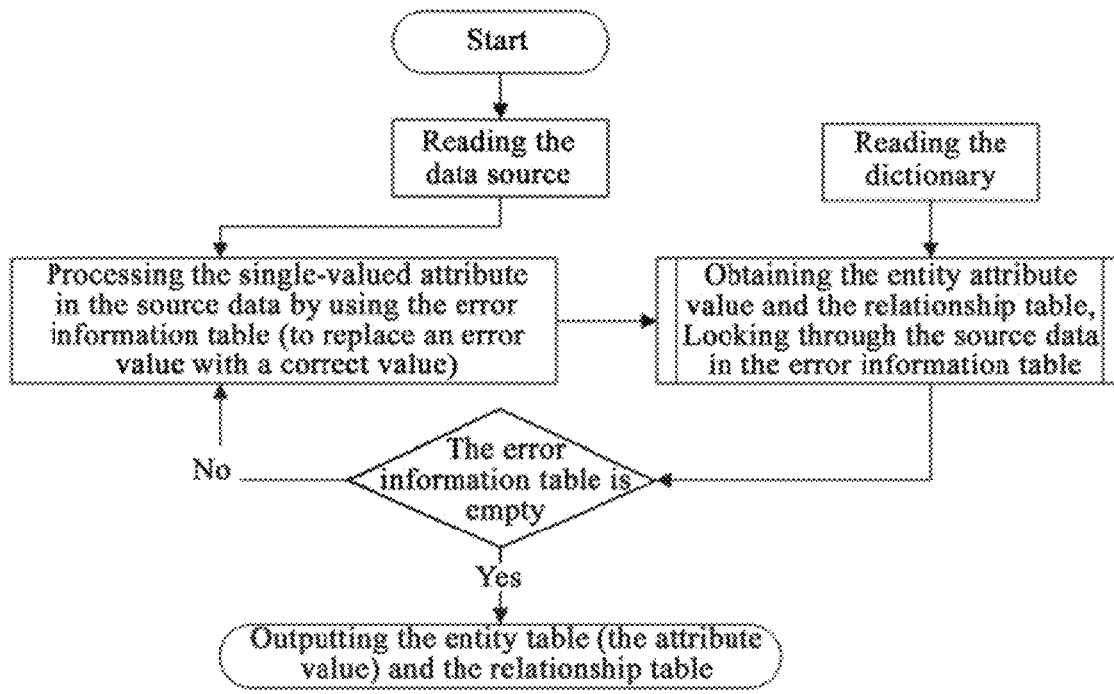

FIGS. 4*a* and 4*b* are flow diagrams illustrating cleaning the source data according to an embodiment of the present disclosure. In this embodiment, referring to FIG. 4, the electronic apparatus may process the single-valued attribute in the source data by using the error information table to replace an error value in the single-valued attribute with a correct value (corresponding to step 401 in FIG. 4). The single-valued attribute refers to an attribute having only one value. Then, the electronic apparatus may inquire entity attribute information and relationship information corresponding to the source data from a preset data dictionary of arts and a relationship table according to the single-valued attribute (corresponding to step 402 in FIG. 4). Thereafter, the electronic apparatus may look through the source data in the error information table (corresponding to step 403 in FIG. 4). Finally, when the error information table does not contain the source data, of which the single-valued attribute is required to be replaced, the electronic apparatus may output the entity attribute information and the relationship information corresponding to the source data (corresponding to step 404 in FIG. 4). When the error information table contains the source data of the single-valued attribute for replacement, the single-value attribute in the source data is continuously replaced until the error information table does not contain the source data of the single-valued attribute for replacement. Therefore, the source data with errors are corrected in the embodiment, such that the accuracy of the source data may be improved, and the accuracy of subsequent inquiry results may be improved.

As shown in FIG. 1, in step 103, entities, attribute information of the entities and relationship information among the entities are extracted from the cleaned source data according to an entity relationship among a painter, a painting and a museum.

In this embodiment, the entity relationship among a painter, a painting and a museum may be preset in the electronic apparatus, so that the electronic apparatus may extract entities, attribute information of the entities and relationship information among the entities from the cleaned source data according to the entity relationship.

As shown in FIG. 1, in step 104, the entities, the attribute information of the entities and the relationship information among the entities are fused to obtain data triples, and the data triples are taken as a built knowledge graph by the keywords.

In this embodiment, a format of the data triples (such as {the entities, the attribute information of the entities and the relationship information among the entities}) may be preset in the electronic apparatus. In this way, after the entities, the attribute information of the entities and the relationship information among the entities are obtained, the entities, the attribute information of the entities and the relationship information among the entities are fused into the data triples, so that the data triples may be used as the knowledge graph built by the keywords, and the effect is shown in FIG. 5.

Figure 5:
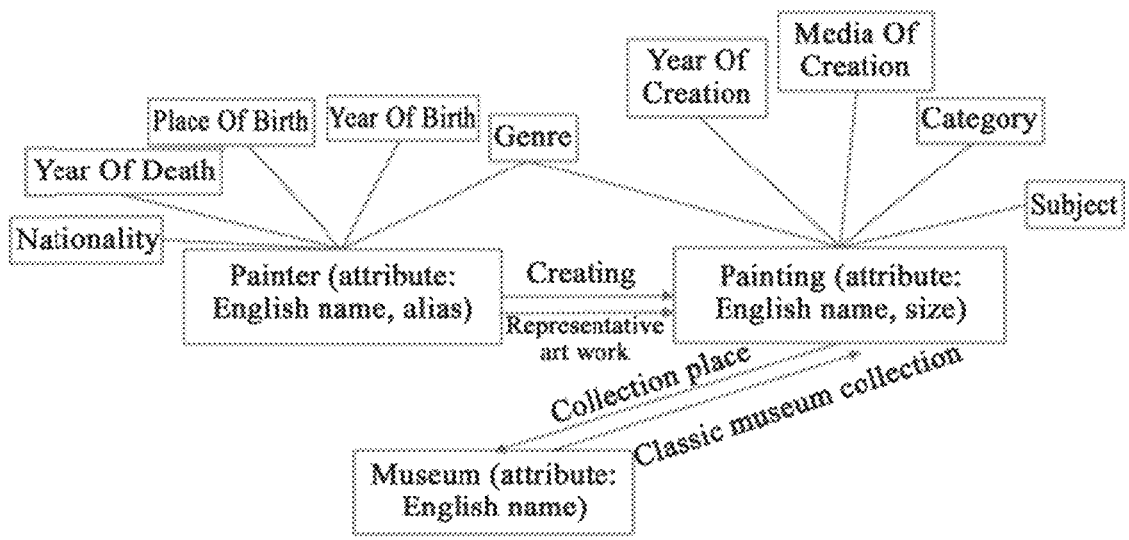
FIG. 5 is a schematic diagram of a knowledge graph according to an embodiment of the present disclosure.

FIG. 5 is a schematic diagram of a knowledge graph according to an embodiment of the present disclosure. Referring to FIG. 5, the knowledge graph includes:

Entities:

A painting, a painter, and a museum.

Attribute Information of the Entities:

The painter: nationality, year of death, place of birth, year of birth, genre, English name, alias.

The painting: genre, year of creation, media of creation, category, subject, English name, alias.

The museum: English name, place, category, and building time.

Relationship Information Among the Entities:

A painters create a painting, a representative art work of a painter is a painting, a museum is a collection place collecting paintings, and a classic museum collection of the museums are paintings.

Figure 6:
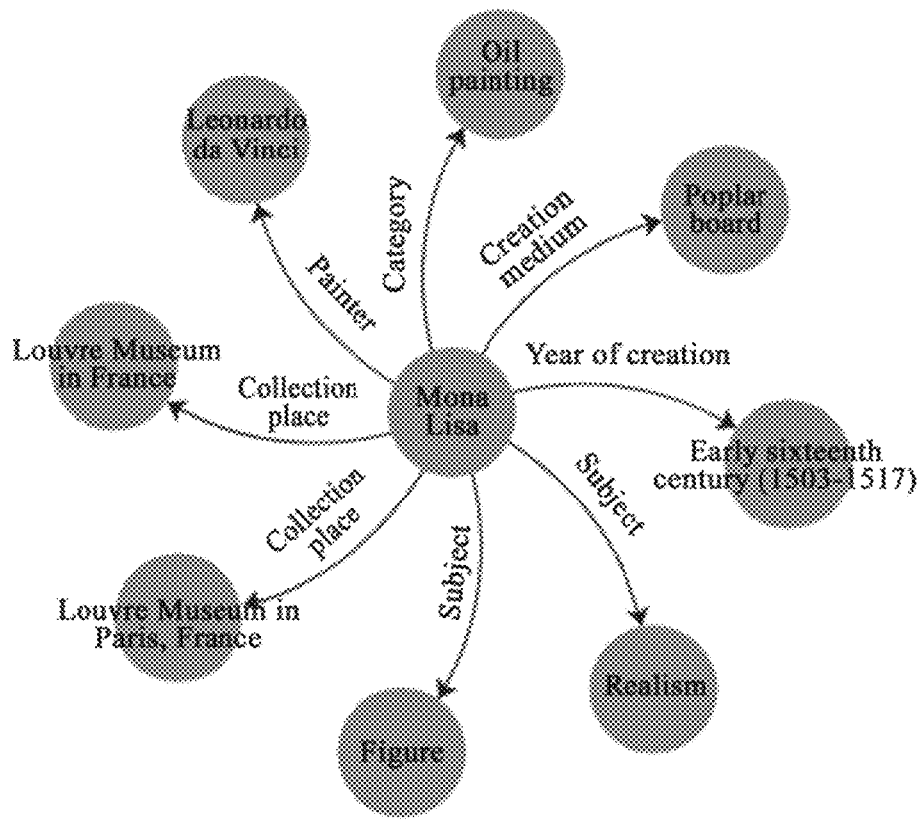
FIG. 6 is a schematic diagram illustrating a knowledge graph of a painting according to an embodiment of the present disclosure.

FIG. 6 is a diagram illustrating a knowledge graph of a painting according to an embodiment of the present disclosure. Referring to FIG. 6, a knowledge graph of a painting is taken as an example:

For the painting, the name is "Mona Lisa", the collection place is the Louvre Museum in Paris, France, the painter is Leonardo da Vinci, the category is oil painting, the creation medium is poplar board, the year of creation is early sixteenth century, and the subject is a realism and figure painting.

As shown in FIG. 1, in step 105, the knowledge graph is stored into a preset graph database.

In this embodiment, the electronic apparatus may store the aforementioned knowledge graph in a preset graph database. For example, a Neo4j system is used to store knowledge images, thereby enabling users to process additions, deletions, modifications, inquiry, transactions, etc. in a graphical database online.

In this embodiment, the knowledge graph may be applied to a preset scene, wherein the preset scene includes at least one of scenes of: encyclopedia cards, searching, recommending, asking and answering, explaining, assisting in decision making.

In the present embodiment, a correctness of the source data may be improved by cleaning the source data; in addition, in the embodiment, the entities, the attribute information and the relationship information are fused to obtain data triples, the data triples may be used as a knowledge graph of the keywords and stored in the graph database, so that a user may conveniently and directly retrieve information on art works in the art field, and a use experience of the user is improved.

According to a second aspect of an embodiment of the present disclosure, there is provided device for building a knowledge graph, including:
- a source data acquisition sub-device (component) configured to acquire source data related to preset keywords according to the preset keywords;
- a source data cleaning sub-device configured to clean the source data according to a preset data dictionary and an error information table;
- an information extraction sub-device configured to extract entities, attribute information of the entities and relationship information among the entities from the cleaned source data according to the preset data dictionary and an entity relationship;
- a graph acquisition sub-device configured to fuse the entities, the attribute information of the entities and the relationship information among the entities to obtain data triples, and take the data triples as a built knowledge graph; and
- a graph storage sub-device configured to store the knowledge graph into a preset graph database.

Figure 7:
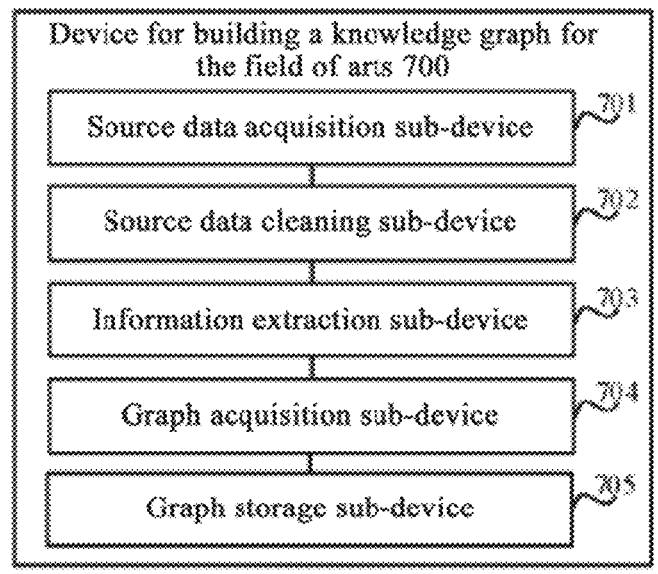
FIG. 7 is a block diagram of a device for building a knowledge graph suitable for the field of arts according to an embodiment of the present disclosure.

FIG. 7 is a block diagram of a device 700 for building a knowledge graph suitable for the field of arts according to an embodiment of the present disclosure. Referring to FIG. 7, the device for building a knowledge graph suitable for the field of arts includes:
- a source data acquisition sub-device 701 configured to acquire source data related to preset keywords in the field of arts according to the preset keywords;
- a source data cleaning sub-device 702 configured to clean the source data according to a preset data dictionary of arts and an error information table related to the field of arts;
- an information extraction sub-device 703 configured to extract entities, attribute information of the entities and relationship information among the entities from the cleaned source data according to an entity relationship among a painter, a painting and a museum;
- a graph acquisition sub-device 704 configured to fuse the entities, the attribute information of the entities and the relationship information among the entities to obtain data triples, and take the data triples as a knowledge graph built by the keywords; and
- a graph storage sub-device 705 configured to store the knowledge graph into a preset graph database.

In one embodiment, the source data includes semi-structured source data and structured source data; the source data acquisition sub-device 701 includes:
- a source data crawling component configured to crawl the semi-structured source data on a preset target website related to the field of arts by using a scrapy application framework according to the keywords; and/or,
- a source data retrieval component configured to retrieving the structured source data in a preset database related to the field of arts according to the keywords.

Figure 8:
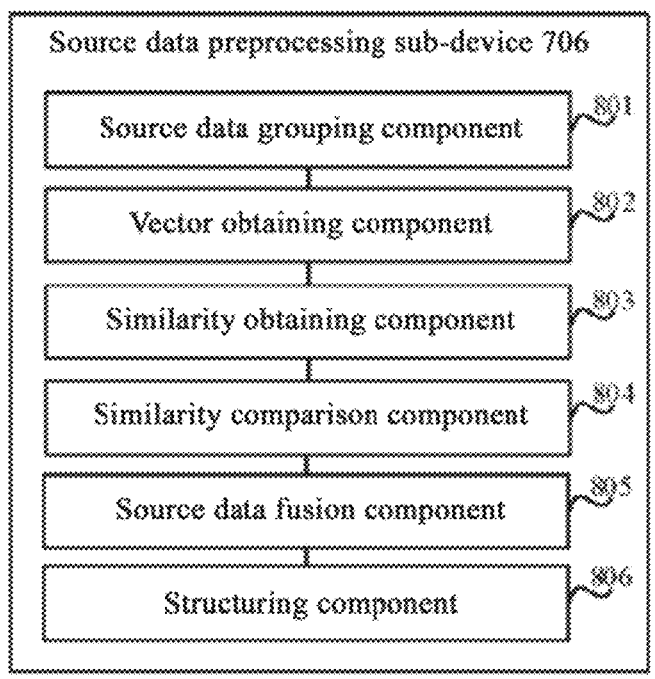
FIG. 8 is a block diagram of a device for building a knowledge graph suitable for the field of arts according to another embodiment of the present disclosure.

FIG. 8 is a block diagram of a device for building a knowledge graph suitable for the field of arts according to another embodiment of the present disclosure. On the basis of the device for building a knowledge graph shown in FIG. 7, referring to FIG. 8, if the source data includes the semi-structured source data, the device further includes a source data preprocessing sub-device 706 configured to preprocess the semi-structured source data to obtain the structured source data; the source data preprocessing sub-device 706 includes:
- a source data grouping component 801 configured to divide the semi-structured source data into a plurality of groups according to preset attribute information;
- a vector obtaining component 802 configured to obtain, based on a Word2vec algorithm, similarity vectors corresponding to data in the semi-structured source data in the plurality of groups;
- a similarity obtaining component 803 configured to obtain a similarity between any two data in a same group based on the similarity vectors;
- a similarity comparison component 804 configured to compare the similarity with a preset similarity threshold;
- a source data fusion component 805 configured to fuse the two data into a piece of semi-structured source data when the similarity exceeds the preset similarity threshold; and
- a structuring component 806 configured to for the fused semi-structured source data, extract corresponding data from the source data to form the structured source data.

Figure 9:
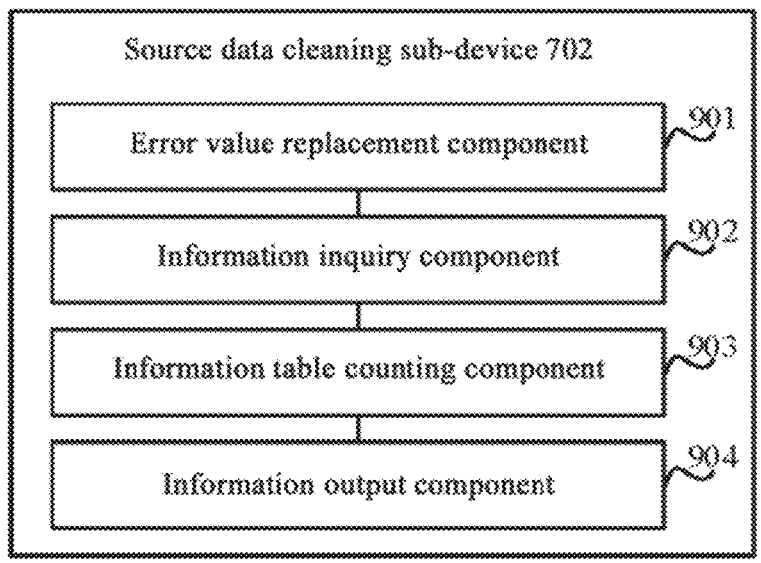
FIG. 9 is a block diagram of a device for building a knowledge graph suitable for the field of arts according to a further embodiment of the present disclosure.
Figure 10:
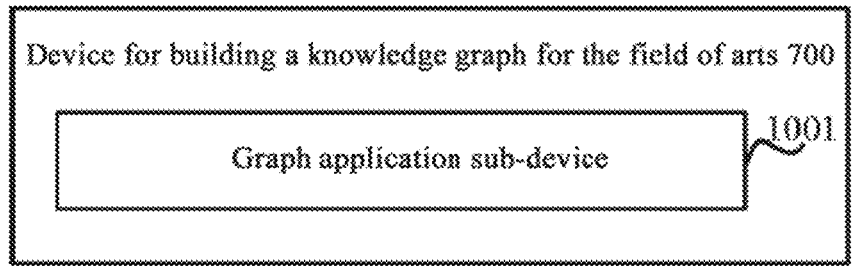
FIG. 10 is a block diagram of a device for building a knowledge graph suitable for the field of arts according to yet another embodiment of the present disclosure.

FIG. 9 is a block diagram of a device for building a knowledge graph suitable for the field of arts according to a further embodiment of the present disclosure. On the basis of the device for building a knowledge graph shown in FIG. 7, referring to FIG. 9, the source data cleaning sub-device 702 includes:
- an error value replacement component 901 configured to process a single-valued attribute in the source data by using the error information table to replace an error value in the single-valued attribute with a correct value;
- an information inquiry component 902 configured to inquire entity attribute information and relationship information corresponding to the source data from the preset data dictionary of arts and a relationship table according to the single-valued attribute;
- an information table counting component 903 configured to look through the source data in the error information table; and
- an information output component 904 configured to output the entity attribute information and the relationship information corresponding to the source data in response to the error information table not containing the source data, of which the single-valued attribute is required to be replaced, FIG. 10 is a block diagram of a device for building a knowledge graph suitable for the field of arts according to yet another embodiment of the present disclosure. On the basis of the device for building a knowledge graph shown in FIG. 7, referring to FIG. 10, the device for building a knowledge graph further includes:
- a graph application sub-device 1001 configured to apply the knowledge graph to a preset scene, wherein the preset scene includes at least one of scenes of: encyclopedia cards, searching, recommending, asking and answering, explaining, assisting in decision making.

It may be understood that the device embodiment provided in the embodiment of the present disclosure correspond to the method embodiment described above, and specific contents may refer to the contents of each method embodiment, which are not described herein again.

According to a third aspect of embodiments of the present disclosure, there is provided an electronic apparatus including a processor and a memory for storing executable instructions; the processor is connected to the memory through a communication bus, and is configured to read executable instructions from the memory to implement the steps of the method of any one of FIGS. 1 to 6.

According to a fourth aspect of embodiments of the present disclosure, there is provided a non-transitory computer-readable storage medium having stored thereon computer-executable instructions that, when executed by a processor, implement the steps of the method of any one of FIGS. 1 to 6.

Figure 11:
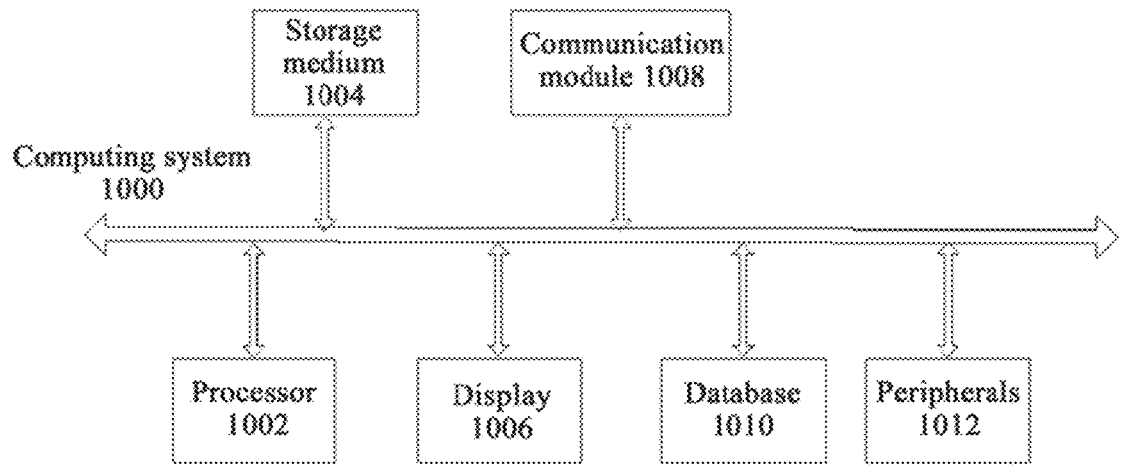
FIG. 11 is a block diagram of an exemplary computing system according to an embodiment of the present disclosure.

The method and the device for building a knowledge graph suitable for the field of arts according to an embodiment of the present disclosure may be implemented on any suitable computing circuitry platform. FIG. 11 is a block diagram of an exemplary computing system according to an embodiment of the present disclosure.

The exemplary computing system 1000 may include any appropriate type of TV, such as a plasma TV, a liquid crystal display (LCD) TV, a touch screen TV, a projection TV, a non-smart TV, a smart TV, etc. The exemplary computing system 1000 may also include other computing systems, such as a personal computer (PC), a tablet or mobile computer, or a smart phone, etc. In addition, the exemplary computing system 1000 may be any appropriate content-presentation device capable of presenting any appropriate content. Users may interact with the computing system 100 to perform other activities of interest.

As shown in FIG. 11, computing system 100 may include a processor 1002, a storage medium 1004, a display 1006, a communication module 1008, a database 1010 and peripherals 1012. Certain devices may be omitted and other devices may be included to better describe the relevant embodiments.

The processor 1002 may include any appropriate processor or processors. Further, the processor 1002 can include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms (such as an image processing algorithm) when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display device or electronic apparatus display such as LCD or OLED based devices. The peripherals 112 may include various sensors and other I/O devices, such as keyboard and mouse.

In the present disclosure, the terms "first," "second," and the like are used for descriptive purposes only and are not to be construed as indicating or implying relative importance. The term "a plurality of" means two or more unless explicitly defined otherwise. In the present disclosure, two components connected by a dotted line are in an electrical connection with each other or in a contact relationship with each other, and the dotted line is used only for the purpose of making the drawings clearer and making a solution of the present disclosure more understandable.

Other embodiments of the present disclosure will be apparent to one of ordinary skill in the art from consideration of the specification and practice of the present disclosure disclosed herein. The present disclosure is intended to cover any variations, uses, or adaptations of the present disclosure following general principles of the present disclosure and including common knowledge or customary technical means in the art which is not disclosed by the present disclosure. The specification and embodiments are considered as exemplary only, and a true scope and a spirit of the present disclosure are indicated by following claims.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

The components (sub-devices) involved in the embodiments of the present disclosure may be implemented by software or hardware. The described components may also be provided in a processor, for example, each of the components may be a software program provided in a computer or a mobile intelligent device, or may be a separately configured hardware device. A name of the component does not in some way limit the component itself.

It will be understood that the present disclosure is not limited to the precise arrangements that have been described above and shown in the drawings, and that various modifications and changes may be made without departing from the scope thereof. The scope of the present disclosure is limited only by the following claims.

What is claimed is:

1. A method for building a knowledge graph, comprising steps of:
acquiring source data related to preset keywords according to the preset keywords;
cleaning the source data according to a preset data dictionary and an error information table;
extracting entities, attribute information of the entities and relationship information among the entities from the cleaned source data according to the preset data dictionary and an entity relationship;
fusing the entities, the attribute information of the entities and the relationship information among the entities to obtain data triples as the knowledge graph; and
storing the knowledge graph into a preset graph database, wherein the keywords are keywords in a field of arts; the preset data dictionary is a data dictionary of arts; the error information table is an error information table related to the field of arts; and the preset entity relationship is a preset entity relationship among a painter, a painting and a museum, wherein the source data comprises semi-structured source data and structured source data; the acquiring source data related to preset keywords according to the preset keywords in the field of arts comprises steps of:

crawling the semi-structured source data on a preset target website related to the field of arts by using a scrapy application framework according to the keywords; and/or, retrieving the structured source data in a preset database related to the field of arts according to the keywords, wherein the structured source data is represented in a unified two-dimensional form, and has the following characteristics: data has a row as a unit, one row of data represents information of one entity, and each row of data has a same attribute, wherein in response to the source data comprising the semi-structured source data, before cleaning the source data according to a preset data dictionary of arts and an error information table related to the field of arts, the method further comprises preprocessing the semi-structured source data to obtain the structured source data, comprising steps of:

dividing the semi-structured source data into a plurality of groups according to preset attribute information;

obtaining, based on a Word2vec algorithm, similarity vectors corresponding to data in the semi-structured source data in the plurality of groups;

obtaining a similarity between any two data in a same group based on the similarity vectors;

comparing the similarity with a preset similarity threshold;

in response to the similarity exceeding the preset similarity threshold, fusing the two data into a piece of semi-structured source data; and for the fused semi-structured source data, extracting corresponding data from the source data to form the structured source data, wherein the step of cleaning the source data according to a preset data dictionary of arts and an error information table related to the field of arts comprises steps of:

processing a single-valued attribute in the source data by using the error information table to replace an error value in the single-valued attribute with a correct value in the error information table, wherein the error information table comprises a combination of several sets of error information and correct information; and the single-valued attribute refers to an attribute having only one value; the data dictionary of arts is updated in real time;

inquiring entity attribute information and relationship information corresponding to the source data from the preset data dictionary of arts and a relationship table according to the single-valued attribute;

looking through the source data in the error information table; and in response to the error information in the error information table not containing the source data, of which the single-valued attribute is required to be replaced, outputting the entity attribute information and the relationship information corresponding to the source data, wherein when the error information in the error information table contains the source data of the single-valued attribute for replacement, the single-value attribute in the source data is continuously replaced until the error information in the error information table does not contain the source data of the single-valued attribute for replacement.

2. The method for building a knowledge graph of claim 1, further comprising:

applying the knowledge graph to a preset scene.

3. The method for building a knowledge graph of claim 2, wherein the preset scene comprises at least one of scenes of: encyclopedia cards, searching, recommending, asking and answering, explaining, assisting in decision making.

4. An electronic apparatus comprising a processor and a memory for storing executable instructions; the processor is connected with the memory through a communication bus and is configured to read the executable instructions from the memory to perform a method comprising steps of:

acquiring source data related to preset keywords according to the preset keywords;

cleaning the source data according to a preset data dictionary and an error information table;

extracting entities, attribute information of the entities and relationship information among the entities from the cleaned source data according to the preset data dictionary and an entity relationship;

fusing the entities, the attribute information of the entities and the relationship information among the entities to obtain data triples as the knowledge graph; and storing the knowledge graph into a preset graph database, wherein the keywords are keywords in a field of arts; the preset data dictionary is a data dictionary of arts; the error information table is an error information table related to the field of arts; and the preset entity relationship is a preset entity relationship among a painter, a painting and a museum, wherein the source data comprises semi-structured source data and structured source data; the acquiring source data related to preset keywords according to the preset keywords in the field of arts comprises steps of:

crawling the semi-structured source data on a preset target website related to the field of arts by using a scrapy application framework according to the keywords; and/or, retrieving the structured source data in a preset database related to the field of arts according to the keywords, wherein the structured source data is represented in a unified two-dimensional form, and has the following characteristics: data has a row as a unit, one row of data represents information of one entity, and each row of data has a same attribute, wherein in response to the source data comprising the semi-structured source data, before cleaning the source data according to a preset data dictionary of arts and an error information table related to the field of arts, the executable instructions read from the memory further cause the processor to perform a step of preprocessing the semi-structured source data to obtain the structured source data, comprising steps of:

dividing the semi-structured source data into a plurality of groups according to preset attribute information;

obtaining, based on a Word2vec algorithm, similarity vectors corresponding to data in the semi-structured source data in the plurality of groups;

obtaining a similarity between any two data in a same group based on the similarity vectors;

comparing the similarity with a preset similarity threshold;

in response to the similarity exceeding the preset similarity threshold, fusing the two data into a piece of semi-structured source data; and for the fused semi-structured source data, extracting corresponding data from the source data to form the structured source data, wherein the step of cleaning the source data according to a preset data dictionary of arts and an error information table related to the field of arts comprises steps of:

processing a single-valued attribute in the source data by using the error information table to replace an error value in the single-valued attribute with a correct value in the error information table, wherein the error information table comprises a combination of several sets of error information and correct information; and the single-valued attribute refers to an attribute having only one value; the data dictionary of arts is updated in real time;

inquiring entity attribute information and relationship information corresponding to the source data from the preset data dictionary of arts and a relationship table according to the single-valued attribute;

looking through the source data in the error information table; and in response to the error information in the error information table not containing the source data, of which the single-valued attribute is required to be replaced, outputting the entity attribute information and the relationship information corresponding to the source data, wherein when the error information in the error information table contains the source data of the single-valued attribute for replacement, the single-value attribute in the source data is continuously replaced until the error information in the error information table does not contain the source data of the single-valued attribute for replacement.

5. The electronic apparatus of claim 4, the executable instructions read from the memory further cause the processor to perform a step of:

applying the knowledge graph to a preset scene.

6. The electronic apparatus of claim 5, wherein the preset scene comprises at least one of scenes of: encyclopedia cards, searching, recommending, asking and answering, explaining, assisting in decision making.

7. A non-transitory computer-readable storage medium having computer-executable instructions stored thereon, wherein the instructions, when executed by a processor, cause the processor to perform a method comprising steps of:

acquiring source data related to preset keywords according to the preset keywords;

cleaning the source data according to a preset data dictionary and an error information table;

extracting entities, attribute information of the entities and relationship information among the entities from the cleaned source data according to the preset data dictionary and an entity relationship;

fusing the entities, the attribute information of the entities and the relationship information among the entities to obtain data triples as the knowledge graph; and storing the knowledge graph into a preset graph database, wherein the keywords are keywords in a field of arts; the preset data dictionary is a data dictionary of arts; the error information table is an error information table related to the field of arts; and the preset entity relationship is a preset entity relationship among a painter, a painting and a museum, wherein the source data comprises semi-structured source data and structured source data; the acquiring source data related to preset keywords according to the preset keywords in the field of arts comprises steps of:

crawling the semi-structured source data on a preset target website related to the field of arts by using a scrapy application framework according to the keywords; and/or, retrieving the structured source data in a preset database related to the field of arts according to the keywords, wherein the structured source data is represented in a unified two-dimensional form, and has the following characteristics: data has a row as a unit, one row of data represents information of one entity, and each row of data has a same attribute, wherein in response to the source data comprising the semi-structured source data, before cleaning the source data according to a preset data dictionary of arts and an error information table related to the field of arts, the computer-executable instructions stored on the non-transitory computer-readable storage medium when executed by a processor further cause the processor to perform a step of preprocessing the semi-structured source data to obtain the structured source data, comprising steps of:

dividing the semi-structured source data into a plurality of groups according to preset attribute information;

obtaining, based on a Word2vec algorithm, similarity vectors corresponding to data in the semi-structured source data in the plurality of groups;

obtaining a similarity between any two data in a same group based on the similarity vectors;

comparing the similarity with a preset similarity threshold;

in response to the similarity exceeding the preset similarity threshold, fusing the two data into a piece of semi-structured source data; and for the fused semi-structured source data, extracting corresponding data from the source data to form the structured source data, wherein the step of cleaning the source data according to a preset data dictionary of arts and an error information table related to the field of arts comprises steps of:

processing a single-valued attribute in the source data by using the error information table to replace an error value in the single-valued attribute with a correct value in the error information table, wherein the error information table comprises a combination of several sets of error information and correct information; and the single-valued attribute refers to an attribute having only one value; the data dictionary of arts is updated in real time;

inquiring entity attribute information and relationship information corresponding to the source data from the preset data dictionary of arts and a relationship table according to the single-valued attribute;

looking through the source data in the error information table; and in response to the error information in the error information table not containing the source data, of which the single-valued attribute is required to be replaced, outputting the entity attribute information and the relationship information corresponding to the source data, wherein when the error information in the error information table contains the source data of the single-valued attribute for replacement, the single-value attribute in the source data is continuously replaced until the error information in the error information table does not contain the source data of the single-valued attribute for replacement.

8. The non-transitory computer-readable storage medium of claim 7, wherein the computer-executable instructions stored on the non-transitory computer-readable storage medium when executed by a processor further cause the processor to perform a step of:

applying the knowledge graph to a preset scene;

wherein the preset scene comprises at least one of scenes of: encyclopedia cards, searching, recommending, asking and answering, explaining, assisting in decision making.

* * * * *